United States Patent
Monajemi et al.

(10) Patent No.: US 11,838,862 B2
(45) Date of Patent: Dec. 5, 2023

(54) COORDINATED TARGET WAKE TIME (TWT) SERVICE FOR LOCALIZED WIRELESS NEIGHBORHOODS

(71) Applicant: Cisco Technology, Inc., San Jose, CA (US)

(72) Inventors: Pooya Monajemi, Irvine, CA (US); Gautam Bhanage, Milpitas, CA (US); David Kloper, Santa Clara, CA (US); Young Il Choi, San Jose, CA (US); Vishal Satyendra Desai, San Jose, CA (US); Santosh Bahaji Kulkarni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/522,774

(22) Filed: Nov. 9, 2021

(65) Prior Publication Data
US 2022/0070773 A1 Mar. 3, 2022

Related U.S. Application Data

(63) Continuation of application No. 16/246,879, filed on Jan. 14, 2019, now Pat. No. 11,197,242.

(51) Int. Cl.
*H04W 52/02* (2009.01)
*H04W 72/20* (2023.01)
(Continued)

(52) U.S. Cl.
CPC ....... *H04W 52/0216* (2013.01); *H04W 72/20* (2023.01); *H04W 84/12* (2013.01); *H04W 92/20* (2013.01)

(58) Field of Classification Search
CPC ........ H04W 72/1289; H04W 56/0015; H04W 56/001; H04W 56/0005
See application file for complete search history.

(56) References Cited

U.S. PATENT DOCUMENTS 9,713,087 B2 7/2017 Asterjadhi et al.
9,980,296 B2 5/2018 Wang et al.
(Continued)

OTHER PUBLICATIONS

Nurchis, et al., "Target Wake Time: Scheduled access in IEEE 802.11ax WLANs", arXiv:1804.07717v1, pp. 1-13, Apr. 20, 2018., arXiv.org.

(Continued)

*Primary Examiner* — Oussama Roudani
(74) *Attorney, Agent, or Firm* — BEHMKE INNOVATION GROUP LLC; James M. Behmke; James J. Wong

(57) ABSTRACT

In one embodiment, a first wireless access point (AP) of a first basic service set (BSS) receives, from a second wireless AP of a second BSS, data indicative of an 802.11-based target wake time (TWT) schedule of a client of the second BSS. The first wireless AP identifies, from the receive data, a scheduled communication time of the client of the second BSS in the TWT schedule. The first wireless AP generates an 802.11-based TWT schedule for a client of the first BSS that avoids the scheduled communication time of the client of the second BSS. The first wireless AP sends the generated 802.11-based TWT schedule to the client of the first BSS, wherein the sent TWT schedule causes the client of the first BSS to wake from sleep at a scheduled wake time.

17 Claims, 12 Drawing Sheets

(51) Int. Cl.
*H04W 92/20* (2009.01)
*H04W 84/12* (2009.01)

(56) References Cited

U.S. PATENT DOCUMENTS

| | | | |
|---|---|---|---|
| 10,716,066 B2* | 7/2020 | Huang | H04W 52/0216 |
| 2014/0328264 A1 | 11/2014 | Merlin | |
| 2015/0063327 A1* | 3/2015 | Barriac | H04W 56/0015 |
| | | | 370/337 |
| 2015/0359008 A1 | 12/2015 | Wang | |
| 2016/0073433 A1 | 3/2016 | Kwon | |
| 2016/0286469 A1 | 9/2016 | Wang et al. | |
| 2016/0381704 A1* | 12/2016 | Chu | H04W 52/0229 |
| | | | 370/329 |
| 2017/0272977 A1* | 9/2017 | Rengarajan | H04W 40/16 |
| 2017/0280388 A1* | 9/2017 | Asterjadhi | H04W 52/0216 |
| 2018/0295573 A1 | 10/2018 | Gidvani | |
| 2018/0376460 A1 | 12/2018 | Atefi | |
| 2019/0007973 A1 | 1/2019 | Lou | |
| 2019/0141630 A1* | 5/2019 | Patil | H04W 52/0229 |
| 2019/0174410 A1 | 6/2019 | Seok | |
| 2019/0174418 A1* | 6/2019 | Kencharla | H04L 5/0053 |
| 2019/0208462 A1* | 7/2019 | Patil | H04W 8/26 |
| 2019/0253968 A1 | 8/2019 | Xiao | |
| 2019/0306790 A1 | 10/2019 | Kottontavida | |
| 2020/0015041 A1 | 1/2020 | Cariou | |
| 2020/0045634 A1 | 2/2020 | Kneckt | |
| 2020/0137702 A1 | 4/2020 | Patil | |
| 2021/0306955 A1* | 9/2021 | Han | H04W 16/02 |

OTHER PUBLICATIONS

Qu, et al., "Survey and Performance Evaluation of the Upcoming Next Generation WLAN Standard—IEEE 802.11ax", arXiv:1806.05908, 155 pages, 2018, arXiv.org.

* cited by examiner

COORDINATED TARGET WAKE TIME (TWT) SERVICE FOR LOCALIZED WIRELESS NEIGHBORHOODS

RELATED APPLICATION

This application is a continuation of U.S. patent application Ser. No. 16/246,879, filed on Jan. 14, 2019, entitled COORDINATED TARGET WAKE TIME (TWT) SERVICE FOR LOCALIZED WIRELESS NEIGHBORHOODS, by Pooya Monajemi, et al., the entire contents of which are incorporated by reference herein.

TECHNICAL FIELD

The present disclosure relates generally to computer networks, and, more particularly, to coordinating target take time (TWT) schedules for localized wireless neighborhoods.

BACKGROUND

Wireless networks are becoming increasingly ubiquitous, with many businesses, schools, and public areas now offering wireless connectivity to authorized users and to guests. With the increasing popularity of wireless networks, the number of different types of wireless clients and wireless protocols is also rapidly increasing. For examples, personal devices now include cellular phones, tablets, wearable devices (e.g., smart watches, head-mounted displays, etc.), while wireless protocol standards (e.g., 802.11ax, 802.11ay, etc.) are under continued development by groups like the Institute of Electrical and Electronics Engineers (IEEE).

An 802.11-based wireless protocol feature (e.g., for 802.11ax) called target wake time (TWT) allows an access point (that provides wireless connectivity to personal devices) and clients of the AP to negotiate specific time windows for when clients are expected to wake up in order to communicate to the AP. TWT creates multiple opportunities for optimization of service in 802.11-based networks that offer it. Further, because TWT offers power saving opportunities, many Internet of things (IoT) devices are likely to heavily utilize this feature.

Additionally, APs, as a part of their normal operation, may perform off-channel scanning to assess spectrum (e.g., transmission medium) quality on channels different that the APs are operating on. The off-channel scanning allows the APs to reach faster convergence and identify potential security vulnerabilities in vicinities of the APs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
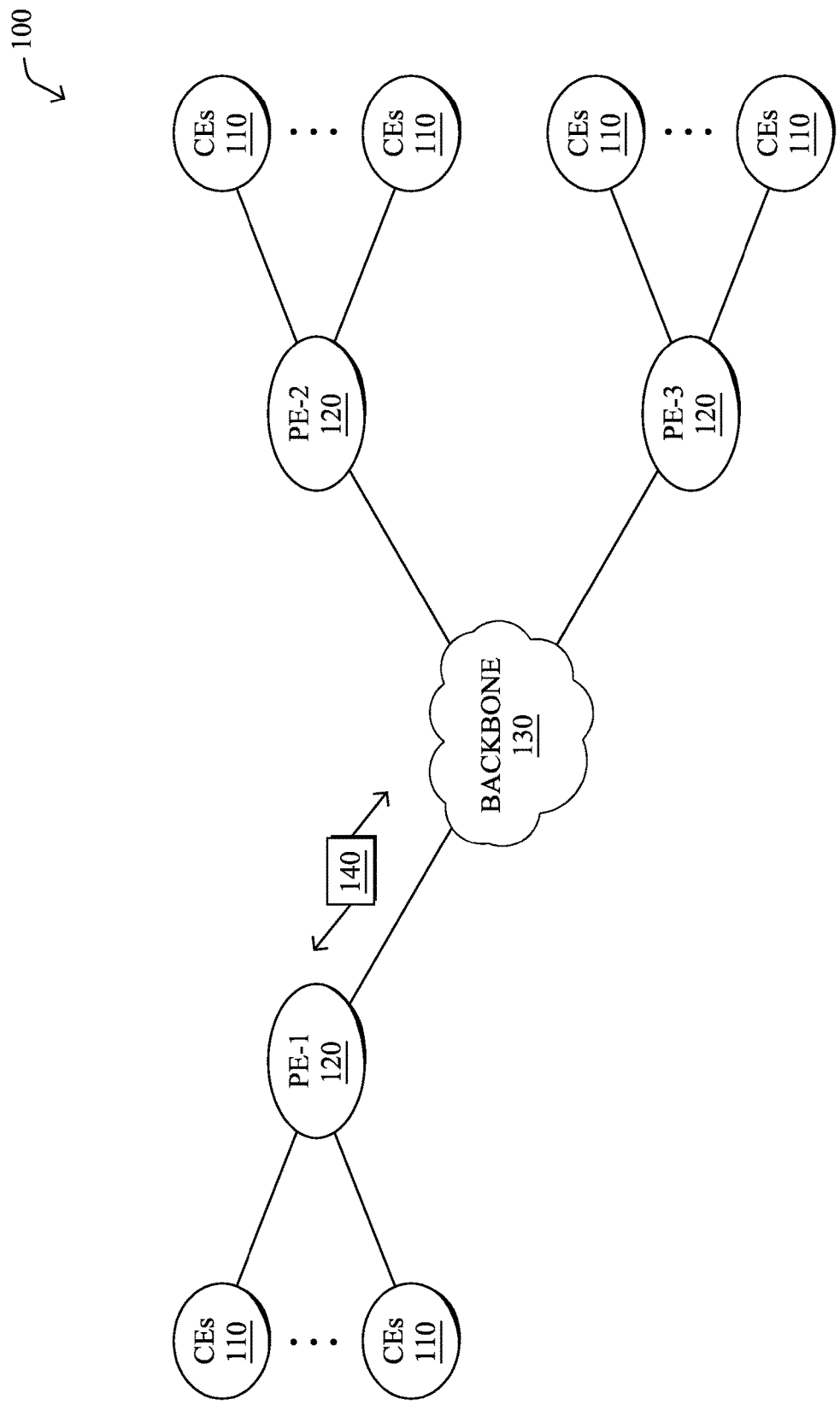
FIGS. 1A-1C illustrate an example communication network.

According to one or more embodiments of the disclosure, a first wireless access point (AP) of a first basic service set (BSS) receives, from a second wireless AP of a second BSS, data indicative of an 802.11-based target wake time (TWT) schedule of a client of the second BSS. The first wireless AP identifies, from the receive data, a scheduled communication time of the client of the second BSS in the TWT schedule. The first wireless AP generates an 802.11-based TWT schedule for a client of the first BSS that avoids the scheduled communication time of the client of the second BSS. The first wireless AP sends the generated 802.11-based TWT schedule to the client of the first BSS, wherein the sent TWT schedule causes the client of the first BSS to wake from sleep at a scheduled wake time.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wireless local area networks (WLANs) to wide area networks (WANs). LANs and WLANs typically connect the nodes over dedicated private communications links (wired or wireless) located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as Institute of Electrical and Electronics Engineers (IEEE) 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110, also called access points (APs), may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
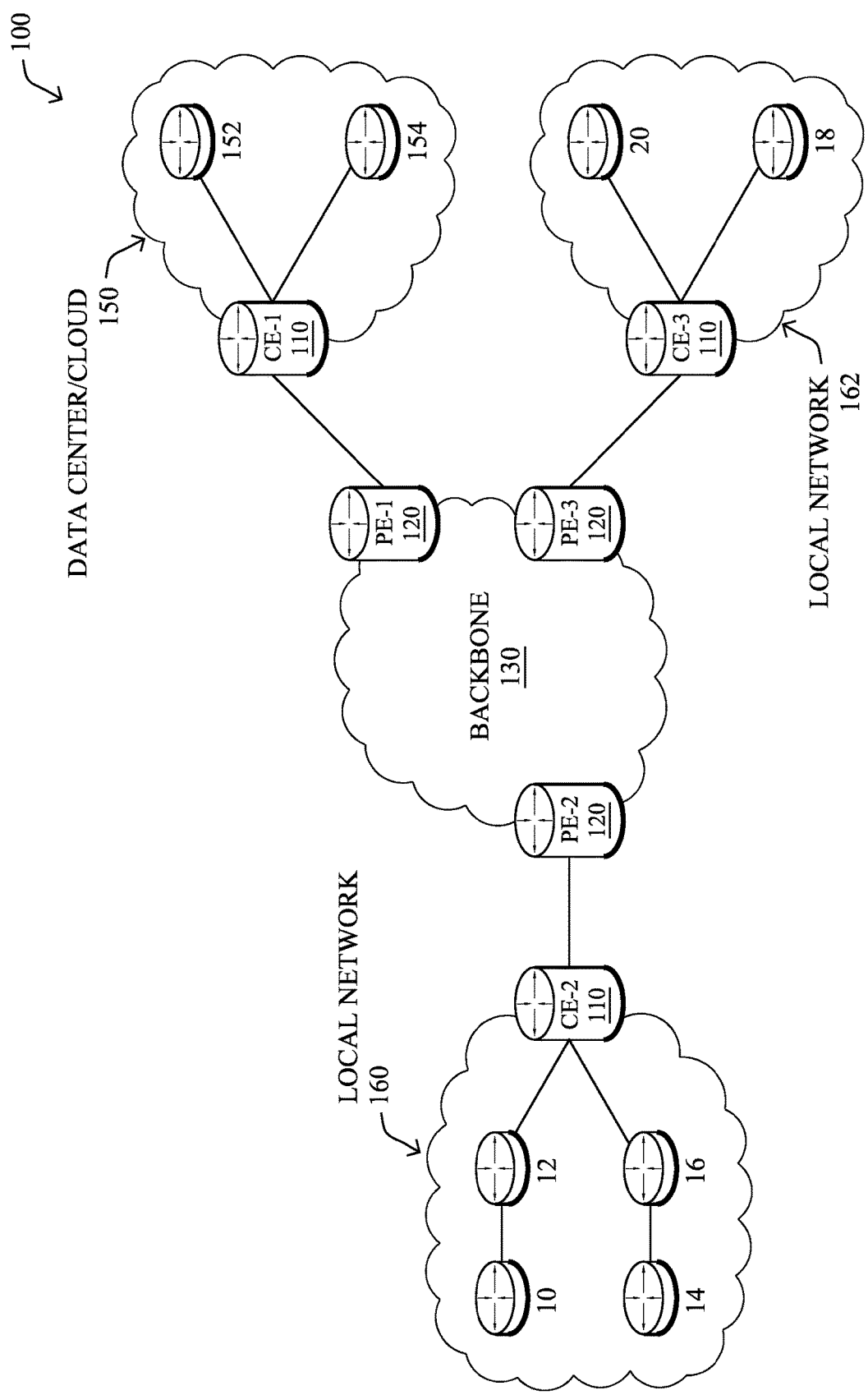

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 1C:
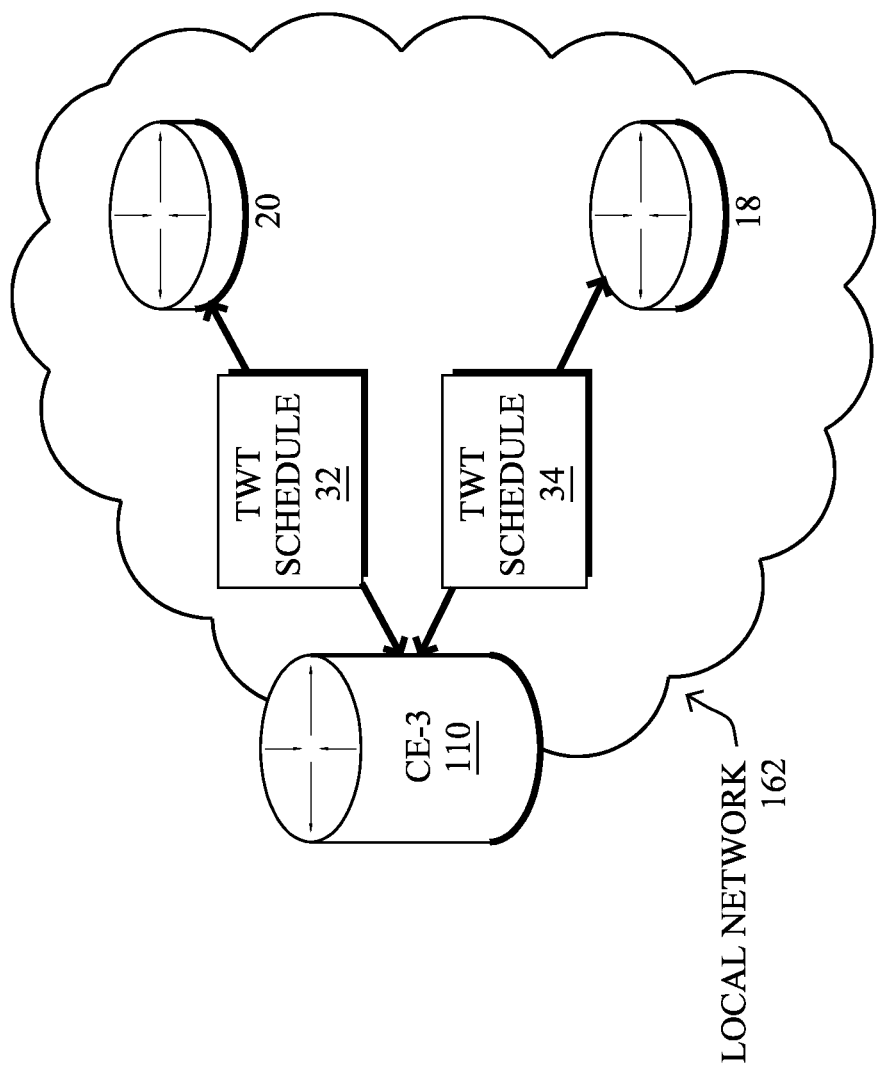

FIG. 1C illustrates an example of a local network 162 in greater detail, according to various embodiments. The CE router (or AP) 110 in FIG. 1C may communicate with the devices/nodes 18-20 in accordance with IEEE 802.11 communication standards. In particular, the CE router (or AP) 110 and the devices/nodes 18-20 may include one or more communications antennas. The one or more communications antennas may be any suitable type of antennas corresponding to, for example, the IEEE 802.11 communication standards. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component(s) to transmit and/or receive signals, such as communications signals among the CE router (or AP) 110 and the devices/nodes 18-20.

The CE router (or AP) 110 and the devices/nodes 18-20 may be configured to perform directional transmission and/or directional reception in conjunction with wirelessly communicating in a wireless network. Such directional transmission and/or reception can be performed using a set of multiple antenna arrays (e.g., DMG antenna arrays or the like). Each of the multiple antenna arrays may be used for transmission and/or reception in a particular respective direction or range of directions. The CE router (or AP) 110 and the devices/nodes 18-20 be configured to perform any given directional transmission a) towards one or more defined transmit sectors and/or b) from one or more defined receive sectors. Additionally, MIMO beamforming in the local network 162 may be accomplished using radio frequency (RF) beamforming and/or digital beamforming. In particular, the CE router (or AP) 110 and the devices/nodes 18-20 may be configured to use all or a subset of its one or more communications antennas to perform MIMO beamforming.

The CE router (or AP) 110 and the devices/nodes 18-20 may include any suitable radio component(s) for transmitting and/or receiving RF signals in a bandwidth and/or channel corresponding to the communications protocols utilized by the CE router (or AP) 110 and the devices/nodes 18-20. The radio component(s) may include hardware and/or software to modulate and/or demodulate communications signals according to pre-established transmission protocols. The radio component(s) may further have hardware and/or software instructions to communicate via one or more IEEE 802.11 communication standards. For example, the radio component(s), in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In another example, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component(s) may include any known receiver and baseband suitable for communicating via the communications protocols. Further, the radio component(s) may include a low noise amplifier (LNA), additional signal amplifiers, an analog-to-digital (A/D) converter, one or more buffers, and digital baseband.

In some embodiments, the CE router (or AP) 110 and the devices/nodes 18-20 may send and/or receive 802.11-based target wake time (TWT) schedules 32, 34 among each other. In general, the CE router (or AP) 110 and the devices/nodes 18-20 can utilize the 802.11-based TWT schedules 32, 34 to negotiate specific time windows during which the devices/nodes 18-20 are expected to wake up (e.g., activate antennas and/or radio component(s)) in order to communicate with the CE router (or AP) 110. The device/nodes 18-20 may be awake prior to and after the negotiated specific time windows (e.g., not necessarily asleep).

Figure 2:
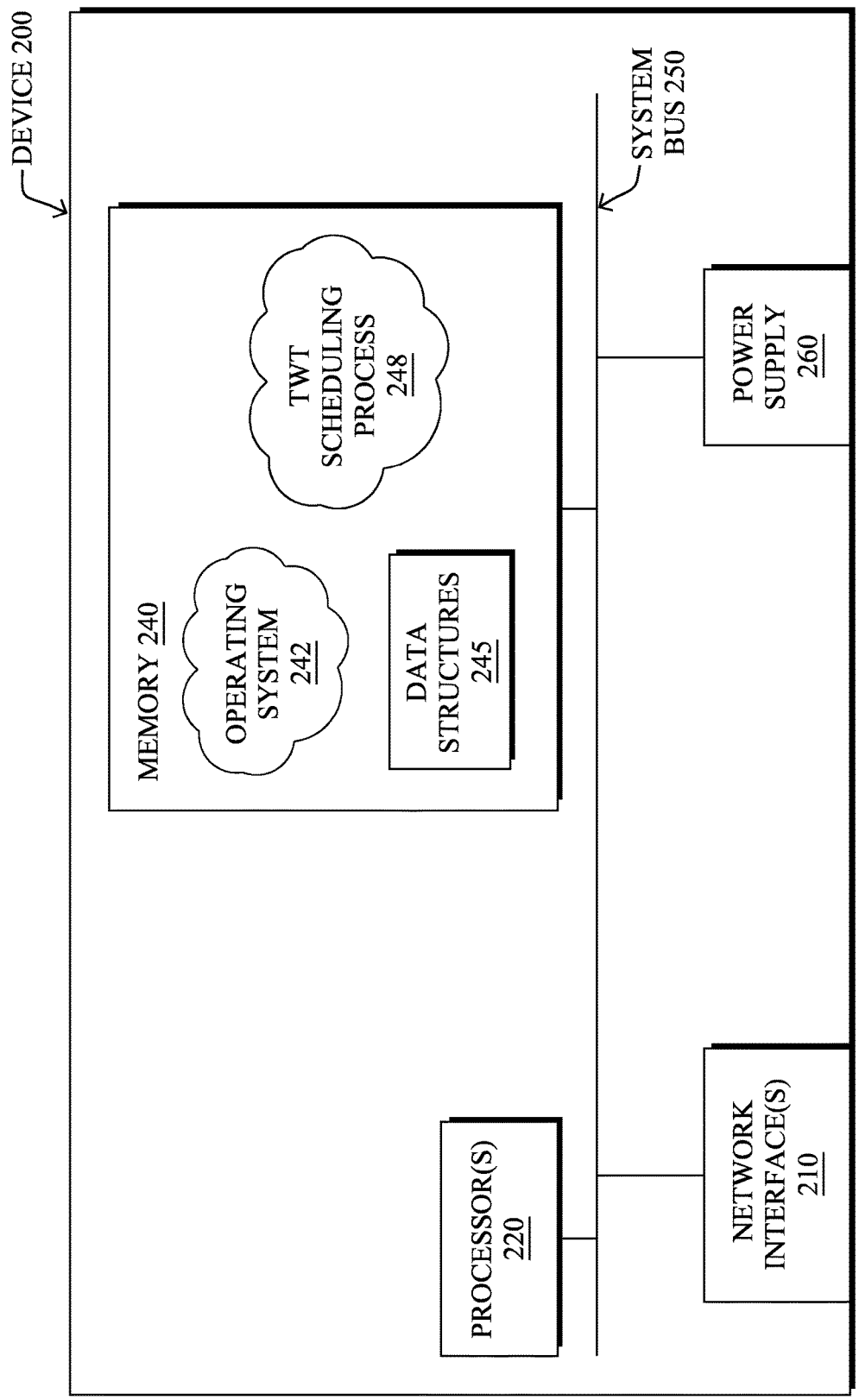
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Further, the network interface(s) 210 may include the antennas and/or radio components described herein above for wireless communications (e.g., according to one or more 802.11 communication standards).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative TWT scheduling process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, TWT scheduling allows a client device to negotiate a wakeup schedule with an AP that the client is associated with, where the client device can sleep for a defined duration and wake up to communicate with the AP for a relatively short scheduled service period at agreed intervals of time. The AP can negotiate the wakeup schedule for an individual client device or group of client devices. This well-known technique of a priori division of time helps to reduce contention for a transmission medium as well as power consumption among client devices served by the AP in a basic service set (BSS). With high data traffic, TWT scheduling allows the AP to manage contention for time resources in a single BSS by splitting the time resources among the clients that would otherwise attempt to access the medium all at the same time (which would lead to reduced media access control (MAC) efficiency).

TWT scheduling is well-suited for IoT devices that operate on limited energy sources (e.g., small batteries) because it is desirable to have the IoT devices minimize wake-times to maximize the energy sources. In a normal operation mode, an AP can negotiate the TWT schedules with its IoT clients, and at the beginning of each TWT window, either send downlink communication to the client or send a trigger frame to receive uplink data from the client.

In a high-density situation where a large number of such IoT devices are connected, managing resources (e.g., time, spectrum, etc.) may become a difficult task. Furthermore, any disruption in an AP's scheduled service on the resources (e.g., on the channel) may collide with possibly many scheduled TWT windows (e.g., by other APs or client devices) and result in loss of service to clients of the AP. The loss of service to the clients can only be resumed in a future TWT window (when the AP is scheduled to provide the service). Additionally, in dense wireless deployments that include a large number of low data-rate IoT devices, APs will need to allocate large timing and scheduling resources to ensure service to all clients of the APs with a possible adverse effect on non-IoT clients.

Coordinated TWT Service for Localized Wireless Neighborhoods

The techniques herein allow for coordinated scheduling gains among APs where inter-BSS contention and interference can be managed. While TWT works well within a single BSS, in a high-density deployment where many nearby co-channel APs are present, TWT also provides an opportunity for coordinated scheduling gains among neighboring APs where inter-BSS contention and interference can be managed. In particular, the scheduling gains can be realized in high contention scenarios (e.g., infra-WLAN deployments that have a plurality of APs) where the traffic on a transmission medium is mostly using TWT, and where nearby cells (e.g., overlapping BSSs (OBSSs)) suffer from each other's interference. Coordinating TWT schedules between neighboring APs allows for reduced contention and interference on transmission media used by the neighboring APs during scheduled communications. Additionally, determinism can be approached across neighboring APs due to the coordinated TWT schedules.

The techniques herein further allow for a distributed TWT service mechanism in which neighboring APs may share their TWT schedules among each other. The distributed TWT service mechanism ensures a) continuity of service to IoT devices in high data throughput scenarios where a large number of data low-rate TWT-compatible devices occupy too much of a spectrum resources in a wasteful manner and b) balanced load on individual APs. In particular, each AP in the neighboring APs is able to service a neighbor AP's IoT client device when the neighbor AP is unable to do so (e.g., during downtime, off-channel s scheduling, etc. that lead to a disruption of service). Furthermore, in scenarios with a large number of IoT devices, the neighboring APs may cohesively share TWT load among themselves to minimize overloading of individual APs. In one embodiment, a common low-bandwidth channel can be allocated among multiple APs for TWT service, while larger bandwidth channels are utilized for high throughput data traffic.

Specifically, according to one or more embodiments of the disclosure as described in detail below, according to one or more embodiments of the disclosure as described in detail below, a first wireless access point (AP) of a first basic service set (BSS) receives, from a second wireless AP of a second BSS, data indicative of an 802.11-based target wake time (TWT) schedule of a client of the second BSS. The first wireless AP identifies, from the receive data, a scheduled communication time of the client of the second BSS in the TWT schedule. The first wireless AP generates an 802.11-based TWT schedule for a client of the first BSS that avoids the scheduled communication time of the client of the second BSS. The first wireless AP sends the generated 802.11-based TWT schedule to the client of the first BSS, wherein the sent TWT schedule causes the client of the first BSS to wake from sleep at a scheduled wake time.

Illustratively, the techniques described herein may be performed by hardware, software, and/or firmware, such as in accordance with the TWT scheduling process 248, which may include computer executable instructions executed by the processor 220 (or independent processor of interfaces 210) to perform functions relating to the techniques described herein.

Figure 3:
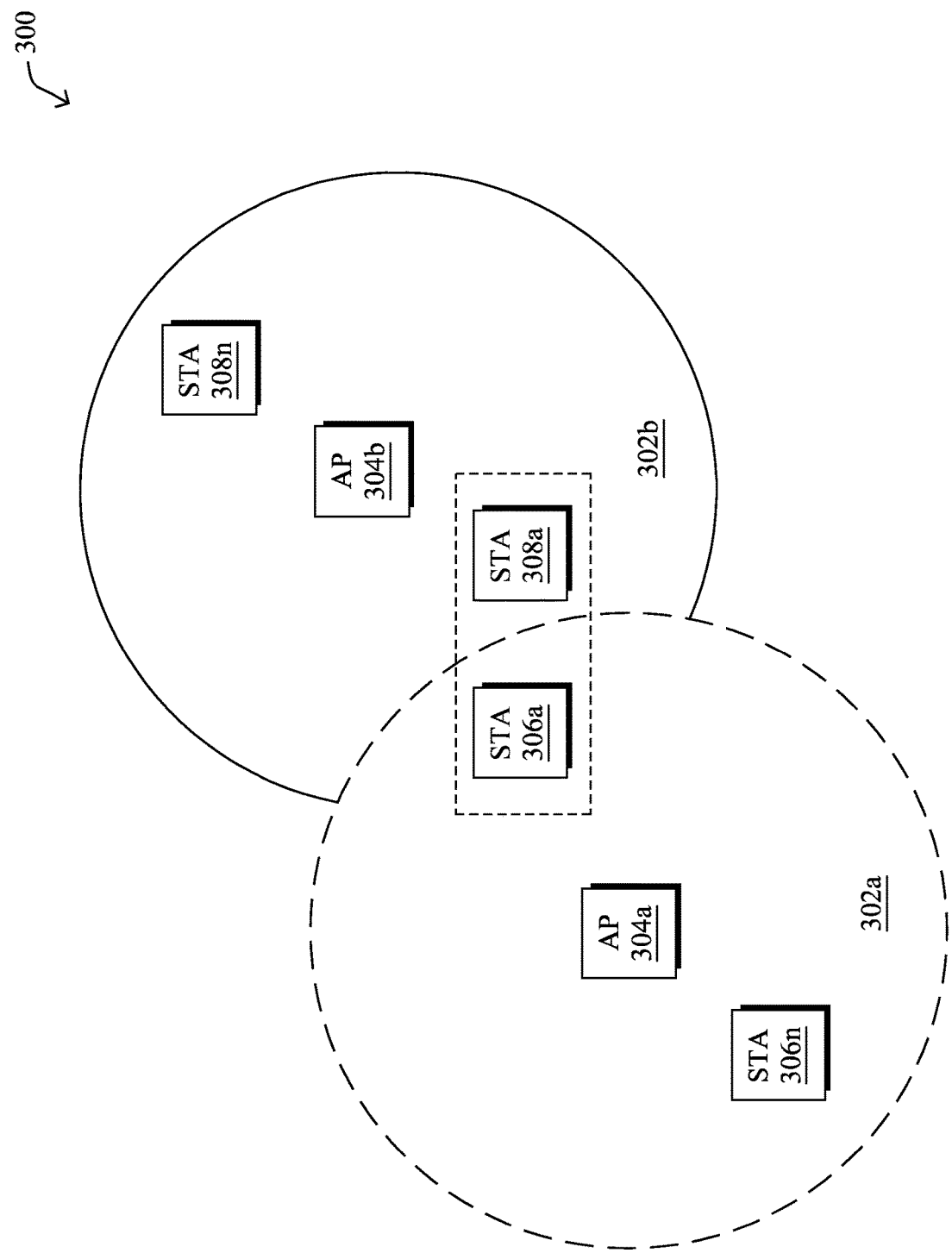
FIG. 3 illustrates an example wireless network that includes a first basic service set (BSS) and a second BSS.

Operationally, consider the wireless network 300 shown in FIG. 3 that includes a first BSS 302a and a second BSS 302b. The first BSS 302a includes a first AP 304a that services a plurality of stations (or client devices) 306a-306n, while the second BSS 302b includes a second AP 304b that services another plurality of stations (or client devices) 308a-308n. As shown in FIG. 3, when station 306a from the first BSS 302a and station 308a from the second BSS 302b concurrently perform an uplink and a downlink transmission, then the downlink transmission in the first BSS 302a may a) either block or be blocked by the uplink transmission in the second BSS 302b or b) suffer a large interference from that transmission. Additionally, reverse direction acknowledgments (ACKs) that accompany any uplink or downlink transmissions will have difficulty in case of such scheduling collisions. Generally, the coordinated TWT scheduling mechanism (performed by the devices of the first BSS 302a and the second BSS 302b) described herein can minimize collisions and interference. It is to be understood that the coordinated TWT scheduling mechanism described herein, while described in relation to the TWT feature presented by 802.11ax, may be used with any compatible scheduled communication mechanism and/or feature of future wireless communications protocols.

Further, it should be noted that, as shown in FIG. 3, another station 306n from the first BSS 302a may not cause interference in communications of another station 308n from the second BSS 302b due not being "nearby" (e.g., the another station 306n does not strongly receive the signals of the another station 308n). Accordingly, the coordinated TWT scheduling mechanism described herein allows for the other stations 306n, 308n to have overlapping TWT schedules (e.g., communication times).

Figure 4A:
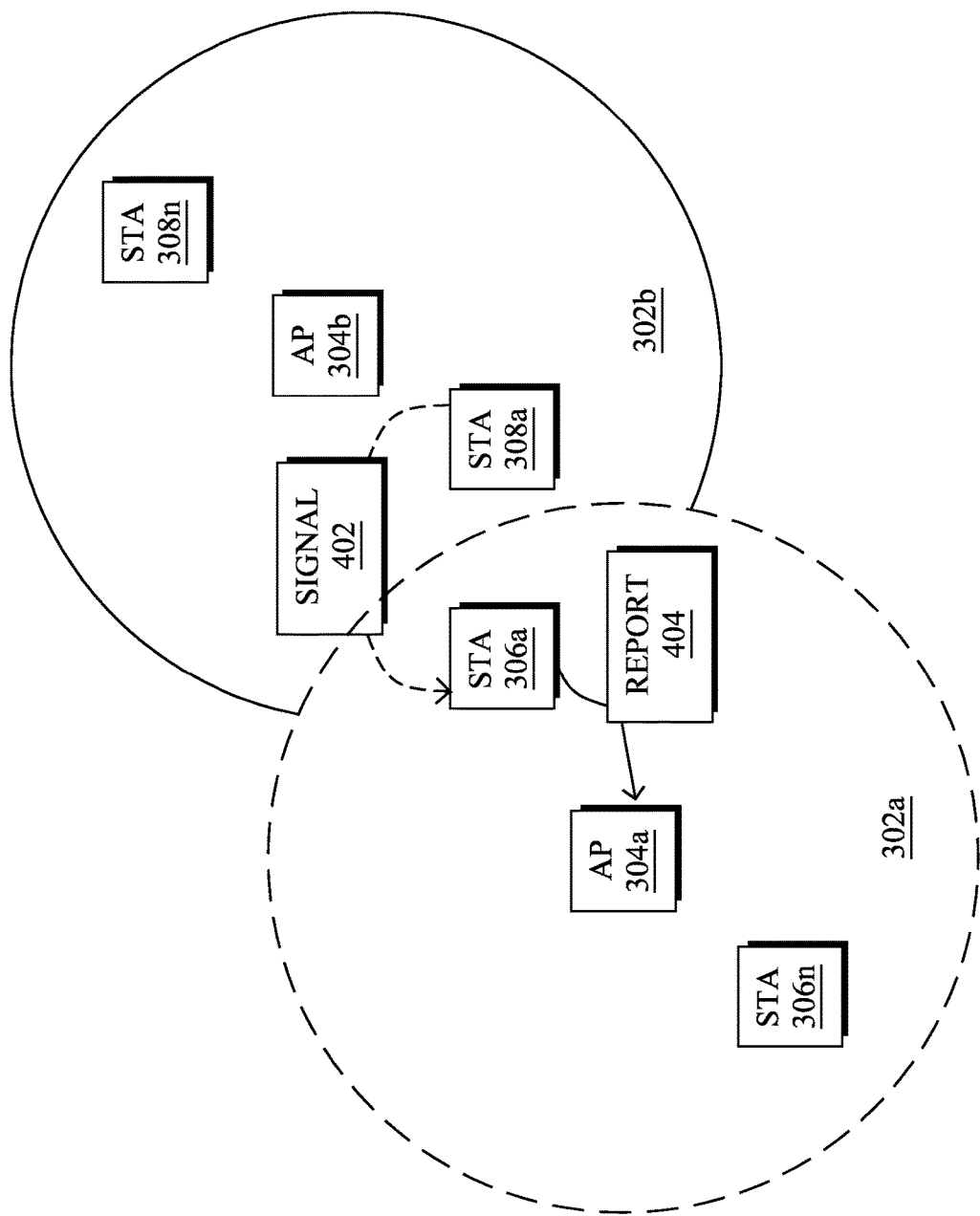
FIGS. 4A-4D illustrate an example wireless network that implements coordination of target wake time (TWT) schedules among the first BSS and the second BSS.

Turning to FIGS. 4A-4D, the example wireless network 300 that implements coordination of TWT schedules among the first BSS 302a and the second BSS 302b is shown. In particular, the first AP 304a can determine that the devices of the second BSS 302b generate strong interference in the first BSS 302a. The second AP 304b of the second BSS 302b can also determine that devices of the first BSS 302a generate strong interference in the second BSS 302a. In FIG. 4A, one process for determining whether (and which) clients of an OBSS are nearby and generate strong interference on BSS signals within a BSS is shown. In particular, and as shown, the second station 308a of the second BSS 302b may generate a signal 402 that causes interference in communications of the first BSS 302a. To identify the signal 402, the second AP 304b may receive a beacon report 404 from the second station 308a that indicates that second station 308a hears (or is within proximity to) the first AP 304a. Using the beacon report, the second AP 304b can determine proximity information that indicates the signal 402 by, for example, taking into account change in transmission power of the second station 308a. Comparatively, a beacon report from another station 308n would not indicate as great a change in transmission power.

Figure 4B:
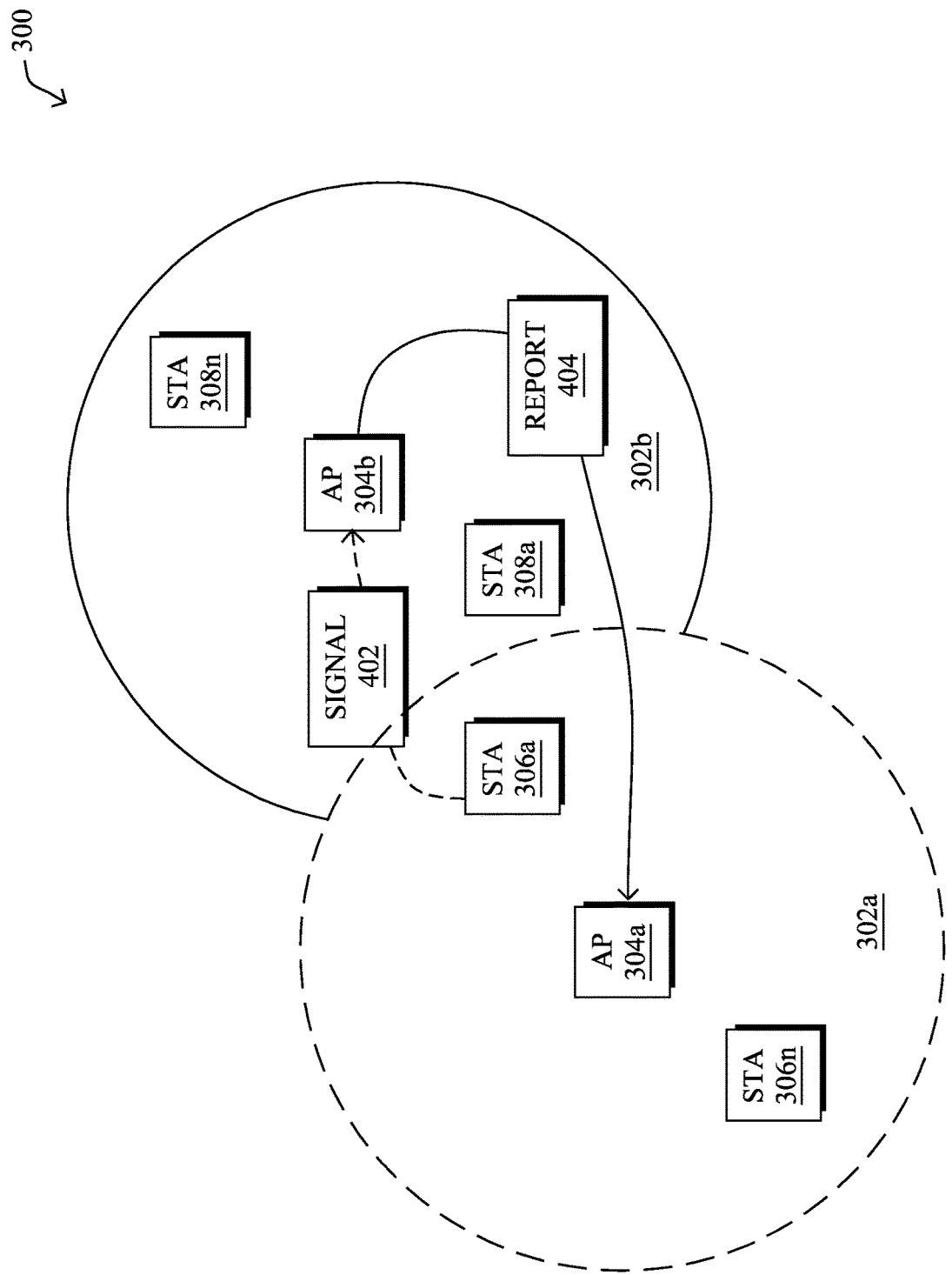

Turning to FIG. 4B, another process for determining whether (and which) clients of an overlapping BSS are nearby and generate strong interference on BSS signals within a BSS is shown. In particular, the second AP 304b may identify that the signal 402 causes interference in operations of the second BSS 302b. The second AP 304b may report the identified signal 402 in a neighborhood report 406 that includes neighbor client information to the first AP 304 of the first (overlapping) BSS 302a. The rate of how often the second AP 304b sends the neighbor report, in an embodiment, can be relatively slow and need not be instantaneous (e.g., immediately when the second AP 304b identifies the signal 402). The first AP 304a can use the neighbor report 406 to determine which set of clients (e.g., among the clients 308a-308n) in the neighboring BSS (e.g., the second BSS 302b) should not have overlapping scheduled transmissions (e.g., TWT periods) with clients 306a-306n of the first BSS 302a.

Figure 4C:
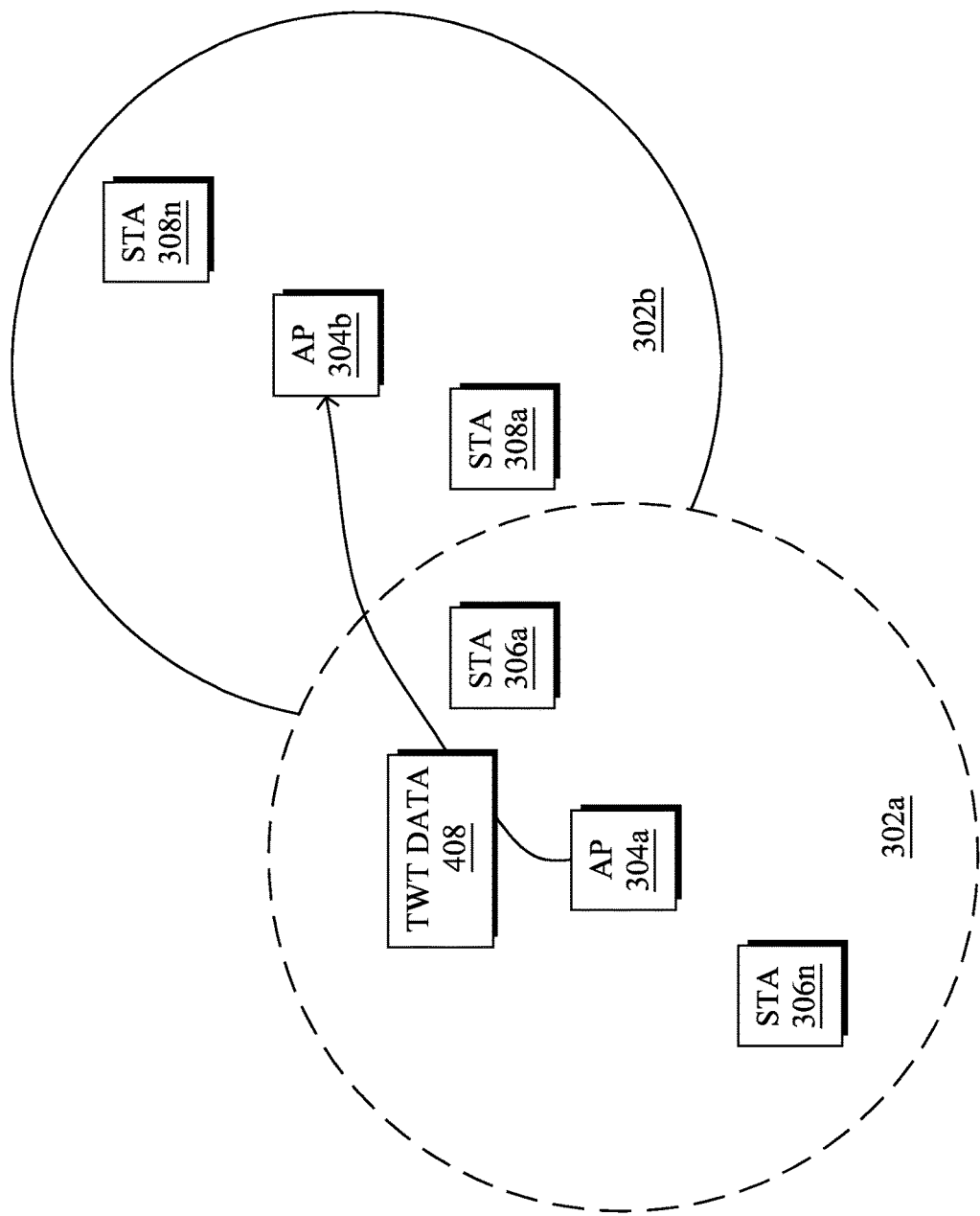

With reference now to FIG. 4C, in order to assist the second AP 304b in optimizing TWT schedules of the second AP 304b, the first AP 304a can share with the second AP 304b data 408 indicative of a TWT schedule of the first AP 304a. The sharing of schedule may be performed over wired backhaul or over the air. It is to be understood that sharing a precise schedule ahead of time may prohibitively difficult to achieve due to time sensitivity, network load, etc., and, that and abstracted TWT schedule may be shared. However, sharing of the entire TWT schedule is also contemplated. More detail regarding the data 408 indicative of the TWT schedule of the first AP 304a is described herein below.

Figure 4D:
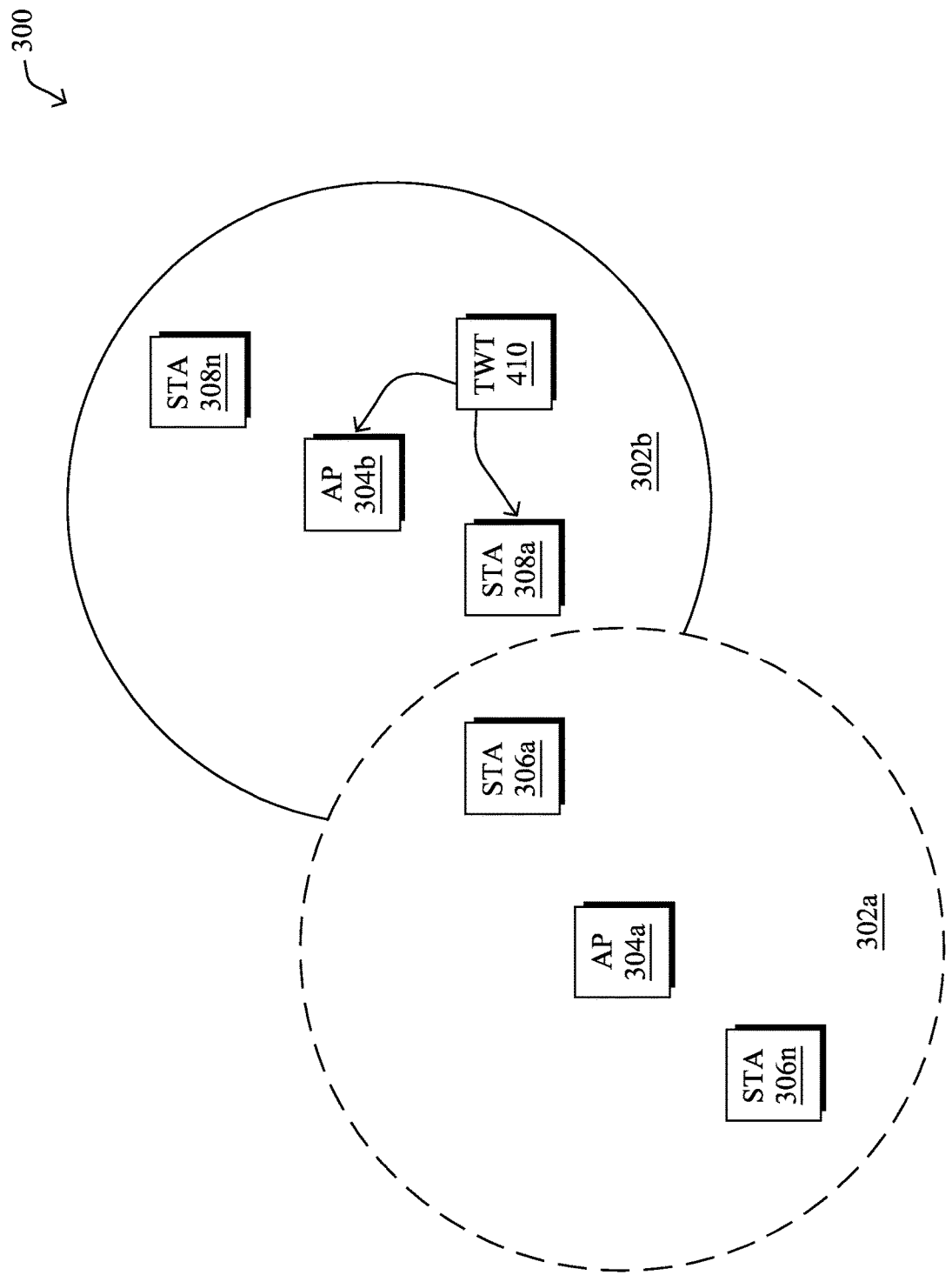
Figure 5:
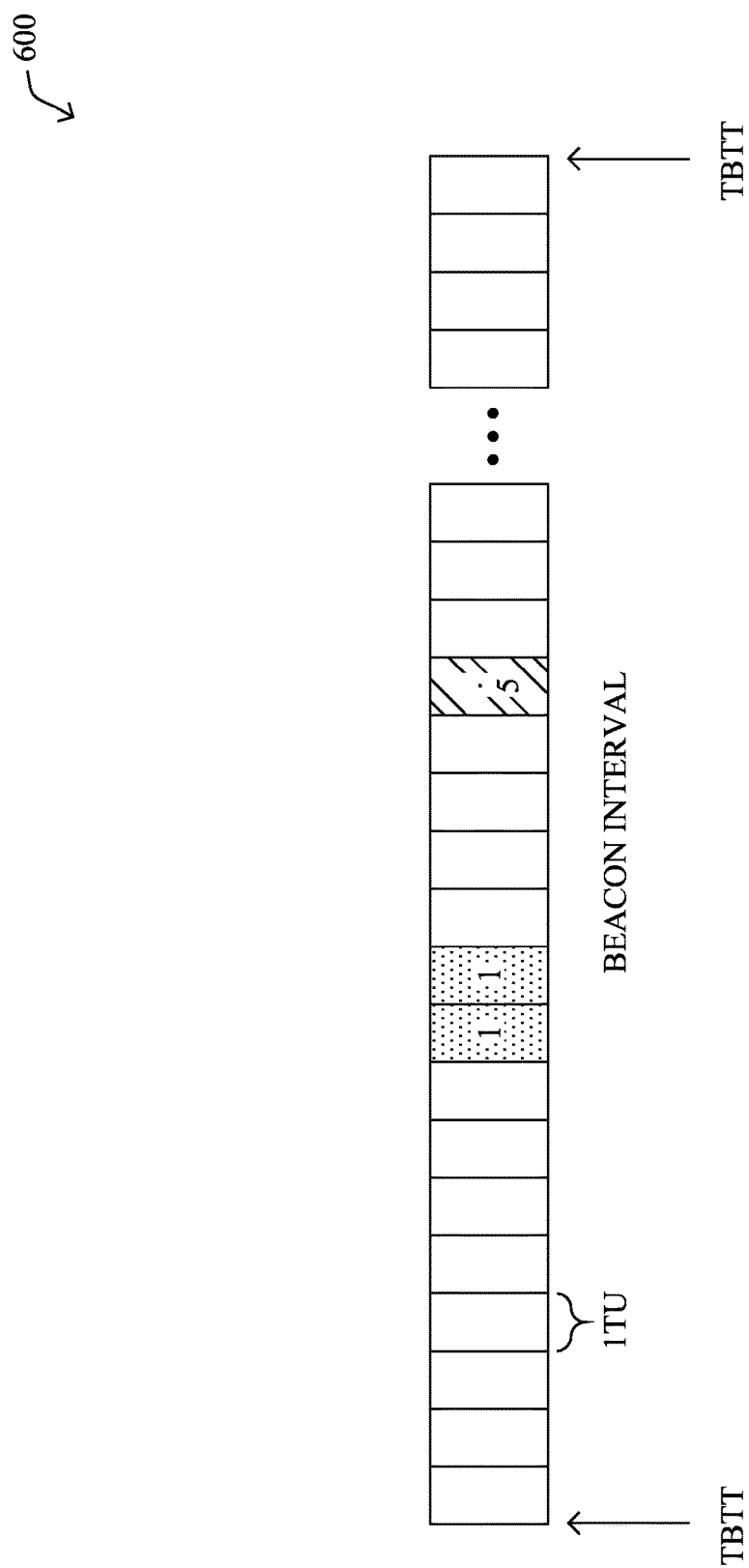
FIG. 5 illustrates an example beacon interval.

As shown in FIG. 4C, after receiving the data 408 indicative of the TWT schedule of the first AP 304a, the second AP 304b can determine a TWT schedule for clients of the second AP 304b that takes into account the interference caused by the first BSS 302a. With reference to FIG. 4D, the second AP 304b can send a TWT schedule 410 to the first client 308a of the second BSS 302b. With more particularly regarding computation of the TWT schedule 410, the second AP 304b, can determine a start time of a TWT of the neighboring BSS (e.g., the first BSS 302a) and compare the start time to its local timeline. To this end, the second AP 304b can perform an algorithm that relies on a coarse level of clock sync between neighboring cells in order to maintain the coordination of schedules. For example, the coarse-grained synchronization can also be achieved by scanning for the neighbors' beacons periodically. Additionally, it is to be understood that the second AP 304b can be configured to aggregate a plurality of data that is indicative of TWT schedules of other APs of other BSSs. Using the aggregated data, the second AP 304b can determine a complete list of slots (e.g., communication times) that are excluded in its own TWT schedule(s). The second AP 304b can then perform a window selection algorithm, described in greater detail herein below, to determine which communication time slots in are to be allocated in the TWT schedule 410 to the stations 308a-308n of the second BSS 302b.

Returning to the data 408 indicative of the TWT schedule of the first AP 304a, the data 408 may include an abstracted TWT schedule of the first AP 304a that may be a list of "red out" time slots where clients known to be in proximity of the neighbor can be scheduled in TWT windows. For example, the first AP 304a shares a schedule with the second AP 304b in which the TWT slots assigned to the first station 306a (known to be close to the second BSS 302b) are "red out". The first AP 304a will specifically do this only for the first station 306a and not the another station 306n because the second AP 304b has sent the neighbor report 406 to the first AP 304a that indicates that the second AP 304b has identified interference from the signal 402.

In more advanced forms, the "red out" periods may be replaced by a metric that is a function of a received signal strength indicator (RSSI) of the first station 306a from the OBSS (e.g., the second BSS 302b) and traffic pattern. In order to streamline the schedule sharing, the data 408 indicative of the TWT schedule of the first AP 304a may be condensed into one beacon period. The condensation of the TWT schedule is performed as follows:

For all clients whose TWT schedule repeats every beacon period (or multiple times each beacon period), simply indicate their metric (or 1) for the scheduled window(s).

For clients whose TWT interval is longer than one beacon period (an integer multiple), multiply their metric by a factor of beacon_interval/TWT_interval. That is, for a client whose TWT interval is two beacon periods, a 0.5 factor is considered.

Figure 6:
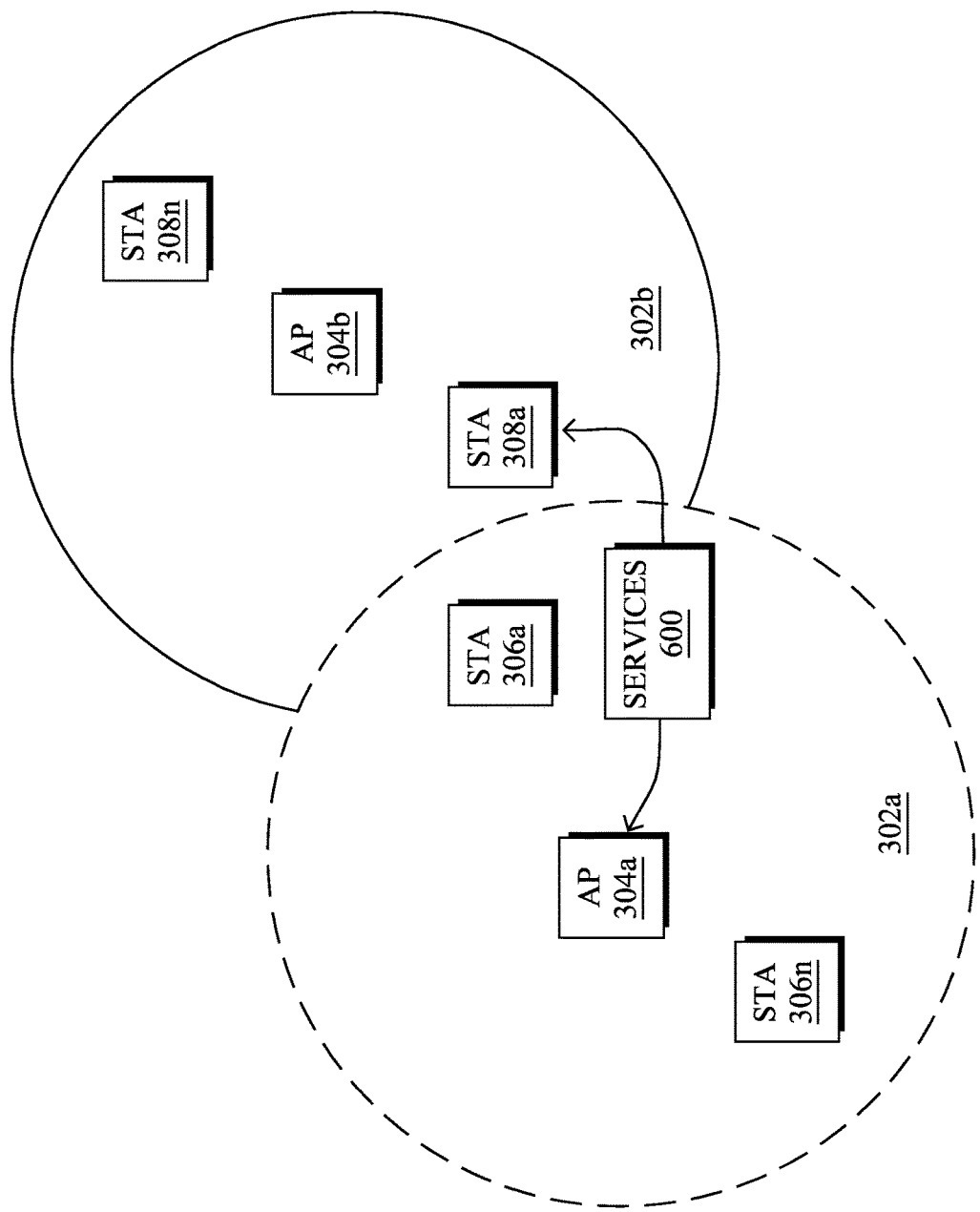
FIG. 6 illustrates an wireless network that implements a distributed TWT service mechanism.

Another addition to computation of the slot factor would be to scale it based on the ratio of the TWT SP/Slot duration. For example, if the TWT Service Period (SP) is 750 microseconds (us) and the slot is 1 time unit (TU)=1024 us, we would scale it by a factor of (750/1024). With reference to FIG. 6, an example beacon interval 600 is shown, where slots of 1 TU are used. It is to be understood that any pre-determined interval used to divide the beacon interval.

Every AP computes this for its beacon interval period starting with its target beacon transmission time (TBTT).

With more particularity regarding the window selection algorithm performed by the second AP 304*b* after receiving the data 408 indicative of the TWT schedule of the first AP 304*a*, the window selection algorithm may be executed every time a client (e.g., stations 308*a*-308*n*) requests to set up a TWT window, or when a new client associates to the second BSS 302*n* and the second AP 304*b* decides to add the new client to a broadcast TWT group. At this point a first wake time for the new client is selected that takes into account the neighboring BSS (e.g., the first BSS 302*a*) information. This is done with the help of the data 408 indicative of the TWT schedule of the first AP 304*a*.

The second AP 304*b* may enforce a wake interval that is an integer multiple of the beacon period and may also select an optimal first wake time such that collisions with neighboring BSS's (e.g., the first BSS 302*a*) are avoided. It is to be understood that selection of the first wake time in effect means a time shift in the TWT windows of the client. In a scenario with low client count cases, selection of the window can be a matter of simply avoiding certain red-out periods during beacon interval. In denser client scenarios, an objective function can be defined to be minimized over the beacon interval. For example, for a given window, a cost function that is to be minimized can be defined where cost( )=integrate_over_window_time(sum_over_overlapping_BSSs(function(OBSS_RSSI))). The optimization routine at each AP will then solve for the following: a) minimize: cost( ) and b) subject to: constraint that the requested TWTs fall within a bound of the requested values.

In some embodiments, the second AP 304*b* may select to form TWT groups that are to be scheduled in individual windows in a beacon period. The second AP 304*b* may group clients based on RF proximity, such that all clients in a TWT group have similar signals to OBSS neighbors. Once grouping is decided, a window assignment algorithm can be performed that optimizes the arrangement in time of the windows assigned to each group. The window assignment algorithm may evaluate the quality of an assignment based on an objective function which is evaluated based on the observed RSSI's of the group's clients in nearby cells where objective( )=sum_overTWTgroups(sum_over_clients_in_a_TWTgroup(metric_function(client_to_nea rby_colliding_cell_RSSIs))). The assignment can then be optimized based on this objective function using a range of available optimization algorithms, such as simulated annealing. In a multi-AP deployment with many nearby co-channel APs, each AP simultaneously executes this optimization and over a few iterations, a globally pseudo-optimal solution is achieved in a distributed fashion in order to reduce inter-BSS contention.

Various other embodiments of the wireless network 300 described herein above are contemplated, including:
1. The first AP 304*a* or the second AP 304*b* may be configured to dynamically switch-around existing TWT assignments in order to further optimize the schedule.
2. Centrally coordinated optimization—a central device such as the wireless controller may be configured collect the schedule information (e.g., data indicative of TWT schedules of the first AP 304*n* or the second AP 304*b*) as well as the nearby-client reports (and beacon reports) and optimize the window assignment centrally.
3. The first AP 304*a* or the second AP 304*b* may be configured to use time-slots for TWT windows that are aligned among the neighbors. It is to be understood that TWT window durations need not be the same and only need to comply with a slot time that aligns with the rest of the neighborhood.
4. Information about clients that are transmitting in proximity to an AP (e.g., the first AP 304*a* or the second AP 304*b*) but not according to a TWT schedule can be ignored by neighboring APs (e.g., excluded in a neighbor report). In particular, the clients may be ignored in the metric calculations since such clients are equally like to transmit over the entire TWT repetition period.
5. In highly dense scenarios, each change of window assignment in one cell (e.g., the first BSS 302*a* or the second BSS 302*b*) may trigger many changes in the neighborhood. Such a condition in a distributed optimization scheme may result in an unstable system that does not converge. In such cases damping (hysteresis) mechanisms may be introduced, such as restraining the number of TWT window switches to a limited count at a time.
6. The first AP 304*a* or the second AP 304*b* may be configured to group individual clients into TWT groups, where the grouping of individual clients may be based on many parameters including traffic patterns. Generally, all clients that are grouped together must be observed to be in proximity of the same nearby cell(s) (e.g., BSSs).

With reference now to FIG. 6, an embodiment of the example wireless network 300 that implements a distributed TWT service mechanism is shown. In particular, the first AP 304*a* and the second AP 304*b* may be configured to share their respective TWT schedules, similarly to as described herein above. Each of the APs can be configured to provide services to clients of a neighboring AP when the neighboring AP is unable to provide the services. Further, in scenarios with a large number of IoT devices, APs in a localized neighborhood can cohesively share the TWT load among themselves to minimize overloading of individual APs. As shown in FIG. 6, the first AP 304*a* may provide services 600 to a station 308*a* of the second BSS 302*b*.

With more particularity, a master node (e.g., one of the APs, a controller, etc.) may determine an optimal TWT service schedule within a sector. This service schedule will impact the off-channel services of the APs, such that at one point in time only one AP is scheduled to service the IoT clients on a given channel. It is to be understood that an AP does not need to be present on the channel at all times. The TWT windows can be set up such that they only occupy certain periods of time, when neighborhood APs happen to scan the channel. The schedule is determined and negotiated with the stations.

During off-channel periods, APs can be configured to go off-channel to IoT stations' primary channels and impersonate their BSS identifier (BSSID) to serve the IoT stations. The master node may adjust the schedule once a known disruption such as radio down-time or software upgrade is about to occur in an AP. Time synchronization, as described above, may be performed between the immediate neighbors in order to ensure the alignment of off-channel scans to the common plan. Further, the master node may select one low bandwidth channel and assign the low bandwidth channel for a set of low-rate TWT devices. The TWT windows are negotiated such that they will collectively occupy certain times when known neighbors are scheduled to scan the common TWT channel as part of their normal off-channel scan schedule.

Figure 7:
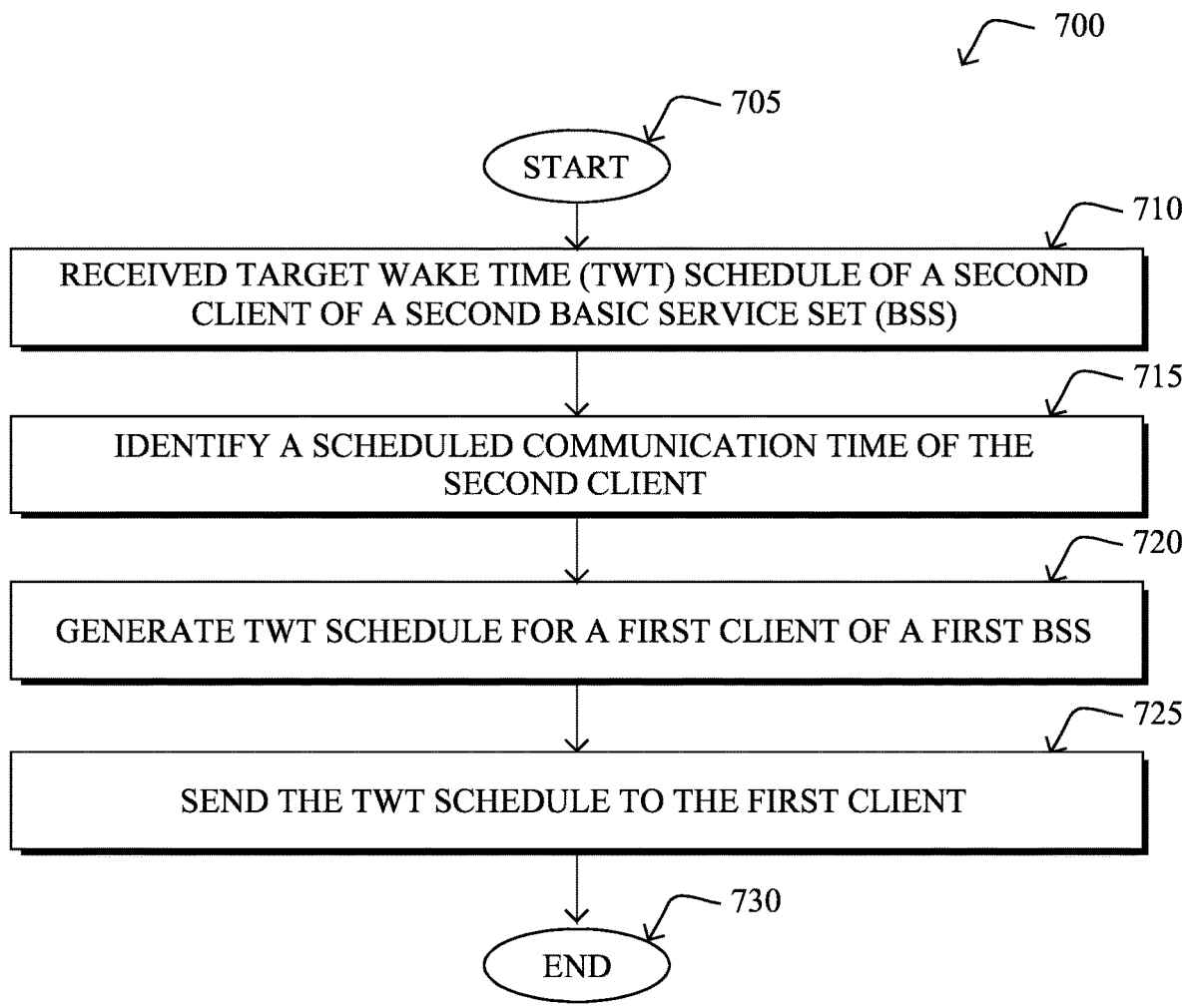
FIG. 7 illustrates an example simplified procedure for coordinating TWT schedules in a wireless network.

FIG. 7 illustrates an example simplified procedure for coordinating TWT schedules of a plurality of BSSs in a wireless network in accordance with one or more embodiments described herein. For example, a non-generic, specifically configured device (e.g., device 200) may perform procedure 400 by executing stored instructions (e.g., process 248). The procedure 700 may start at step 705, and continues to step 710, where, as described in greater detail above, a first AP of a first BSS may receive data indicative of an 802.11-based TWT schedule of a client of a second BSS from a second AP. The first AP may identify potential of interference in the first BSS by communications of the client of the second BSS due to proximity of the client of the second BSS to the first AP. As described in greater detail herein above, the second AP may determine to include a scheduled communication time of a client of the second BSS based on a determination that the client of the second BSS may cause interference in communication s of the first BSS (e.g., by using beacon report(s), neighbor report(s), etc.).

At step 715, the first AP may identify a scheduled communication time of the client of the second BSS in the TWT schedule from the received data. Further, the first AP may aggregate the scheduled communication time of the client of the second BSS with other scheduled communication times of clients of the second BSS.

At step 720, the first AP may generate an 802.11-based TWT schedule for a client of the first BSS that avoids the scheduled communication time of the client of the second BSS. As described in greater detail herein above, the first AP may perform a window selection algorithm to identify to select communication time(s) in the generated 802.11-based TWT schedule.

At step 725, the first AP may send the generated 802.11-based TWT schedule to the client of the first BSS, wherein the sent TWT schedule causes the client of the first BSS to wake from sleep at a scheduled wake time. In various embodiments, the first AP may identify an Internet of things (IoT) device among clients of the second BSS and impersonate a BSSID of the IoT device during at least one off channel period of the first wireless AP. Procedure 700 then ends at step 730.

It should be noted that while certain steps within procedure 1000 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for coordinated scheduling gains among APs where inter-BSS contention and interference can be managed. In particular, the scheduling gains can be realized in high contention scenarios (e.g., infra-WLAN deployments that have a plurality of APs) where the traffic on a transmission medium is mostly using TWT, and where nearby cells (e.g., overlapping BSSs (OBSSs)) suffer from each other's interference. Coordinating TWT schedules between neighboring APs allows for reduced contention and interference on transmission media used by the neighboring APs during scheduled communications. Additionally, determinism can be approached across neighboring APs due to the coordinated TWT schedules.

While there have been shown and described illustrative embodiments that provide for coordinating TWT schedules across a plurality of BSSs, it is to be understood that various other adaptations and modifications may be made within the spirit and scope of the embodiments herein. For example, while certain protocols and specific scheduling features for such protocols are described, such as, respectively, 802.11ax and TWT, other suitable protocols and corresponding scheduling features may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a first wireless AP of a first BSS and from a second wireless AP of a second BSS, data indicative of an 802.11-based TWT schedule of one or more clients of the second BSS;
determining, by the first wireless AP and based on the data indicative of the 802.11-based TWT schedule of the one or more clients of the second BSS, a TWT service schedule that defines TWT windows during which the first wireless AP provides services to the one or more clients of the second BSS;
identifying, by the first wireless AP, an IoT device among the one or more clients of the second BSS; and
servicing, by the first wireless AP and based on the TWT service schedule, the IoT device of the second BSS by impersonating a BSS identifier (BSSID) of the IoT device of the second BSS during at least one off-channel period of the first wireless AP,
wherein the first wireless AP services the IoT device of the second BSS at a time when the second wireless AP is unable to service the IoT device of the second BSS.

2. The method of claim 1, further comprising:
identifying, by first wireless AP, potential of interference in the first BSS by communications of the IoT device of the second BSS due to proximity of the IoT device of the second BSS to the first wireless AP.

3. The method of claim 2, wherein identifying, by first wireless AP, the potential of interference comprises:
receiving, by the first wireless AP, at least one beacon report from at least one client of the first BSS, the at least one beacon report indicative of the potential of interference.

4. The method of claim 2, wherein identifying, by first wireless AP, the potential of interference comprises:
receiving, by the first wireless AP, a signal of the IoT device of the second BSS; and
reporting, by the first wireless AP, the signal of the IoT device to the second wireless AP, wherein the second wireless AP sends the data indicative of the 802.11-based TWT schedule of the IoT device of the second BSS after the reporting.

5. The method of claim 1, further comprising:
aggregating, by the first wireless AP, a scheduled communication time of the IoT device of the second BSS with scheduled communication times of other clients of the second BSS.

6. The method of claim 1, further comprising:
negotiating, by the first wireless AP, the TWT service schedule with the second wireless AP.

7. The method of claim 6, wherein the TWT windows defined by the TWT service schedule are negotiated such that only the first wireless AP is scheduled to service the IoT device of the second BSS at a given time.

8. An apparatus, comprising:
one or more network interfaces to communicate with a network;
a processor coupled to the one or more network interfaces and configured to execute one or more processes; and
a memory configured to store a process that is executable by the processor, the process, when executed, being configured to:
receive, at a first wireless AP of a first BSS and from a second wireless AP of a second BSS, data indicative of an 802.11-based TWT schedule of one or more clients of the second BSS;
determine, by the first wireless AP and based on the data indicative of the 802.11-based TWT schedule of the one or more clients of the second BSS, a TWT service schedule that defines TWT windows during which the first wireless AP provides services to the one or more clients of the second BSS;
identify, by the first wireless AP, an IoT device among the one or more clients of the second BSS; and
service, by the first wireless AP and based on the TWT service schedule, the IoT device of the second BSS by impersonating a BSS identifier (BSSID) of the IoT device of the second BSS during at least one off-channel period of the first wireless AP,
wherein the first wireless AP services the IoT device of the second BSS at a time when the second wireless AP is unable to service the IoT device of the second BSS.

9. The apparatus as in claim 8, wherein the process, when executed, is further configured to:
identify, by first wireless AP, potential of interference in the first BSS by communications of the IoT device of the second BSS due to proximity of the IoT device of the second BSS to the first wireless AP.

10. The apparatus as in claim 9, wherein the first wireless AP identifies the potential of interference in the first BSS by:
receiving, by the first wireless AP, at least one beacon report from at least one client of the first BSS, the at least one beacon report indicative of the potential of interference.

11. The apparatus as in claim 9, wherein the first wireless AP identifies the potential of interference in the first BSS by:

receiving, by the first wireless AP, a signal of the IoT device of the second BSS; and
reporting, by the first wireless AP, the signal of the IoT device to the second wireless AP, wherein the second wireless AP sends the data indicative of the 802.11-based TWT schedule of the IoT device of the second BSS after the reporting.

12. The apparatus as in claim 8, wherein the process, when executed, is further configured to:
aggregate, by the first wireless AP, a scheduled communication time of the IoT device of the second BSS with scheduled communication times of other clients of the second BSS.

13. The apparatus as in claim 8, wherein the process, when executed, is further configured to:
negotiate, by the first wireless AP, the TWT service schedule with the second wireless AP.

14. The apparatus as in claim 13, wherein the TWT windows defined by the TWT service schedule are negotiated such that only the first wireless AP is scheduled to service the IoT device of the second BSS at a given time.

15. A tangible, non-transitory, computer-readable medium that stores program instructions that cause a computer to execute a process comprising:
receiving, at a first wireless AP of a first BSS and from a second wireless AP of a second BSS, data indicative of an 802.11-based TWT schedule of one or more clients of the second BSS;
determining, by the first wireless AP and based on the data indicative of the 802.11-based TWT schedule of the one or more clients of the second BSS, a TWT service schedule that defines TWT windows during which the first wireless AP provides services to the one or more clients of the second BSS;
identifying, by the first wireless AP, an IoT device among the one or more clients of the second BSS; and
servicing, by the first wireless AP and based on the TWT service schedule, the IoT device of the second BSS by impersonating a BSS identifier (BSSID) of the IoT device of the second BSS during at least one off-channel period of the first wireless AP,
wherein the first wireless AP services the IoT device of the second BSS at a time when the second wireless AP is unable to service the IoT device of the second BSS.

16. The tangible, non-transitory, computer-readable medium as in claim 15, the process further comprising:
negotiating, by the first wireless AP, the TWT service schedule with the second wireless AP.

17. The tangible, non-transitory, computer-readable medium as in claim 16, wherein the TWT windows defined by the TWT service schedule are negotiated such that only the first wireless AP is scheduled to service the IoT device of the second BSS at a given time.

* * * * *

UNITED STATES PATENT AND TRADEMARK OFFICE
CERTIFICATE OF CORRECTION

PATENT NO. : 11,838,862 B2  
APPLICATION NO. : 17/522774  
DATED : December 5, 2023  
INVENTOR(S) : Pooya Monajemi et al.

Page 1 of 1

It is certified that error appears in the above-identified patent and that said Letters Patent is hereby corrected as shown below:

In the Specification

Column 11, Line 47 please amend as shown:  
n_a_TWTgroup(metric_function(client_to_nearby_collid- Signed and Sealed this  
Twenty-seventh Day of February, 2024

Katherine Kelly Vidal  
*Director of the United States Patent and Trademark Office*